United States Patent
Westermann et al.

(10) Patent No.: US 6,807,994 B2
(45) Date of Patent: Oct. 26, 2004

(54) PNEUMATIC TIRE HAVING A RUBBER COMPONENT CONTAINING A RUBBER GEL AND SYNDIOTATIC 1,2-POLYBUTADIENE

(75) Inventors: Stephan Franz Westermann, Trier (DE); Georges Marcel Victor Thielen, Schouweiler (LU); Ghislain Adolphe Leon Thise, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 127 days.

(21) Appl. No.: 10/071,905

(22) Filed: Feb. 8, 2002

(65) Prior Publication Data

US 2002/0170642 A1 Nov. 21, 2002

Related U.S. Application Data

(60) Provisional application No. 60/275,320, filed on Mar. 13, 2001.

(51) Int. Cl.$^7$ .............................. B60C 1/00; C08L 9/00
(52) U.S. Cl. ...................... 152/450; 152/525; 152/539; 152/541; 152/543; 525/102; 525/213; 525/232; 525/233; 525/236; 525/238
(58) Field of Search ............................... 152/450, 525, 152/539, 541, 543; 525/102, 213, 232, 233, 236, 238

(56) References Cited

U.S. PATENT DOCUMENTS

| 5,283,294 A | 2/1994 | Hsu et al. ................... 525/247 |
| 5,307,850 A | 5/1994 | Halasa et al. ............... 152/209 |
| 5,395,891 A | 3/1995 | Obrecht et al. ............. 525/194 |
| 5,859,142 A | 1/1999 | Muraoka et al. ............ 525/236 |
| 6,107,389 A | 8/2000 | Oishi et al. ................. 524/575 |
| 6,127,488 A | 10/2000 | Obrecht et al. ............. 525/333 |

FOREIGN PATENT DOCUMENTS

| EP | 0517537 | 12/1992 |
| EP | 0517538 | 12/1992 |
| EP | 1078953 | 8/2000 |

OTHER PUBLICATIONS

European Search Report.

*Primary Examiner*—Jeffrey Mullis
(74) *Attorney, Agent, or Firm*—John D. DeLong

(57) ABSTRACT

A pneumatic tire having a rubber component where the rubber in said component is comprised of (A) from 10 to 75 phr of a rubber gel selected from the group consisting of polybutadiene gel, styrene butadiene gel, acrylonitrile-butadiene gel, chloroprene gel, natural rubber gel, and mixtures thereof;

(B) from 1 to 25 phr of syndiotactic 1,2-polybutadiene; and (C) a rubber containing olefinic unsaturation.

16 Claims, No Drawings

PNEUMATIC TIRE HAVING A RUBBER COMPONENT CONTAINING A RUBBER GEL AND SYNDIOTATIC 1,2-POLYBUTADIENE

This application claims benefit to U.S. provisional application Ser. No. 60/275,320, filed on Mar. 13, 2001.

BACKGROUND OF THE INVENTION

U.S. Pat. No. 5,395,891 discloses rubber mixtures containing a polybutadiene gel. The rubber mixtures is disclosed for use in the tread of a pneumatic tire.

U.S. Pat. No. 6,127,488 discloses rubber mixtures prepared from at least one styrene butadiene rubber gel and at least one rubber which contains double bonds.

EP 517538 discloses a pneumatic tire having a tread composed of a rubber composition which includes a rubber component and particulates of a crystalline syndiotactic 1,2-polybutadiene resin.

SUMMARY OF THE INVENTION

The present invention relates to a pneumatic tire having a rubber component containing a rubber gel and syndiotactic 1,2-polybutadiene.

DETAILED DESCRIPTION OF THE INVENTION

There is disclosed a pneumatic tire having a rubber component where the rubber in said component is comprised of (A) from 10 to 75 phr of a rubber gel selected from the group consisting of polybutadiene gel, styrene butadiene gel, acrylonitrile-butadiene gel, chloroprene gel, natural rubber gel, and mixtures thereof;

(B) from 1 to 25 phr of syndiotactic 1,2-polybutadiene; and (C) a rubber containing olefinic unsaturation.

A critical ingredient in the rubber used in the rubber component is a rubber gel. The term "rubber gel" is used herein to describe polybutadiene gel, styrene butadiene gel, acrylonitrile-butadiene gel, chloroprene gel and natural rubber gel. The preferred gels are polybutadiene gel and styrene butadiene gel. From 10 to 75 phr of a rubber gel is used in the rubber for use in the component of the pneumatic tire. Preferably, from 20 to 50 phr of the gel is used in the rubber.

Representative styrene butadiene gels which may be used for use in the present invention are described in U.S. Pat. No. 6,127,488 which is incorporated by reference in its entirety.

The rubber gels also include such polymeric copolymers grafted with polar unsaturated monomers such as acrylic acid, methacrylic acid, acrylamide, methacrylamide, N-methoxymethyl methacrylic acid amide, N-methoxymethyl methacrylic acid amide, N-acetoxymethyl methacrylic acid amide, acrylonitrile, dimethyl acrylamide, hydroxyethyl acrylate, hydroxyethyl methacrylate, hydroxypropyl acrylate, hydroxypropyl methacrylate, hydroxybutyl acrylate, hydroxybutyl methacrylate and mixtures thereof. The grafted rubber gel may have from 1 to 20 weight percent of its makeup derived from the polar monomers.

The rubber gels have particle diameters of from 20 to 1000, preferably 30 to 400 nm (DVN value to DIN 53 206) and swelling indices ($Q_i$) in toluene of from 1 to 15, preferably 1 to 10. The swelling index is calculated from the weight of the gel when it contains solvent (following centrifuging at 20,000 rpm) and its weight when dry:

$Q_i$ wet weight of gel/dry weight of gel

As an example of determining the swelling index, 250 mg of SBR gel is swelled in 25 ml toluene for 24 hours, with shaking. The gel is centrifuged off and weighed, and is then dried at 70° C. until the weight is constant, and is reweighed.

The stryene butadiene rubber starting products are preferably prepared by emulsion polymerization. In this connection see, for example, I. Franta, *Elastomers and Rubber Compounding Materials*, Elsevier, Amsterdam 1989, Pages 88 to 92.

The styrene butadiene rubber gels are intended to include microgels which are prepared by cross-linking styrene butadiene copolymer which contain from 1 to 80 percent by weight styrene and 99 to 20 percent by weight butadiene. Preferably from 5 to 50 weight percent of the SBR is derived from styrene and the balance being derived from butadiene.

The cross-linking of the rubber starting products to form styrene butadiene rubber gels takes place in the latex state. This may be during polymerization, as a result of continuing the polymerization to high conversions or in the monomer feeding process as a result of polymerization at high internal conversions or as a result of post-cross-linking after polymerization, or both processes may be combined. The rubber starting products may also be prepared by polymerization in the absence of regulators.

The styrene butadiene rubber and polybutadiene rubber may also be cross-linked by copolymerization with multifunctional compounds having a cross-linking action. Preferred multifunctional comonomers are compounds having at least two, preferably 2 to 4, copolymerizable C=C double bonds, such as diisopropenylbenzene, divinylbenzene, divinylether, divinylsulphone, diallyl phthalate, triallyl cyanurate, triallyl isocyanurate, 1,2-polybutadiene, N,N'-m-phenylene maleic imide and/or triallyl trimellitate. The following are furthermore considered: acrylates and methacrylates of polyvalent, preferably divalent to tetravalent, $C_2$–$C_{10}$ alcohols, such as ethylene glycol, propanediol-1,2, butanediol, hexanediol, polyethylene glycol, having 2 to 20, preferably 2 to 8 oxyethylene units, neopentyl glycol, bisphenol A, glycerol, trimethylol propane, pentaerythritol, sorbitol and unsaturated polyesters prepared from aliphatic diols and polyols and maleic acid, fumaric acid and/or itaconic acid.

The styrene butadiene rubbers, as well as the natural rubber, polybutadiene rubber, NBR and chloroprene rubber, may also be cross-linked in the latex form to form rubbers gels, as a result of post-cross-linking them with chemicals having a cross-linking action. Suitable chemicals having a cross-linking action are, for example, organic peroxides, for example, dicumyl peroxide, t-butylcumyl peroxide, bis-(t-butyl-peroxyisopropyl) benzene, di-t-butyl peroxide, dibenzoyl peroxide, bis-(2,4-dichlorobenzoyl) peroxide, t-butyl perbenzoate, and organic azo compounds such as azo-bis-isobutyronitrile and azo-bis-cyclohexanenitrile, and dimercapto and polymercapto compounds such as dimercaptoethane, 1,6-dimercaptohexane, 1,3,5-trimercaptotriazine and mercapto-terminating polysulphide rubbers such as mercapto-terminating reaction products of bis-chloroethyl formal with sodium polysulphide. The optimal temperature for the post-cross-linking operation is naturally dependent on the reactivity of the cross-linking agent and may be from room temperature up to approximately 170° C., optionally at elevated pressure. See in this context Houben-Weyl, *Methoden der organischen Chemie* [Methods

*in Organic Chemistry*], 4$^{th}$ Edition, Volume 14/2, Page 848. Peroxides are particularly preferred cross-linking agents.

It is also optionally possible to enlarge the particles by agglomeration before, during or after the post-cross-linking in latex form.

Styrene butadiene rubbers, as well as the other rubbers which have been prepared in organic solvents, may also serve as starting products for the preparation of the respective rubber gels. In this case, it is advisable to emulsify the rubber solution in water, optionally with the aid of an emulsifying agent, and to follow this, either before or after removing the organic solvent, with cross-linking of the emulsion thus obtained using suitable cross-linking agents. The cross-linking agents previously named are suitable cross-linking agents.

The polybutadiene gel A is produced by emulsion polymerization (see, for example, M. Morton, P. P. Salatiello, H. Landfield, *J. Polymer Science* 8,2 (1952), Pages 215 through 224; P. A. Weerts, J. L. M. van der Loos, A. L. German, Makromol. Chem. 190 (1989), Pages 777 through 788). These references are incorporated by reference in their entirety.

The size of the latex particles (DVN value according to DIN 53 2016) is preferably 30 to 500 nm.

Production by polymerization in the absence of regulators is also possible.

The second critical ingredient in the rubber used in the rubber component is syndiotactic 1,2-polybutadiene, as referred to herein as SPBD. From 1 to 25 phr of the rubber component is syndiotactic 1,2-polybutadiene. Preferably, from 2 to 15 phr is SPBD.

The syndiotactic 1,2-polybutadiene (SPBD) used in the practice of the subject invention normally has more than 70 percent of its monomeric units in a syndiotactic 1,2-configuration. In most cases, the SPBD used in the practice of this invention will have at least about 90 percent of its monomeric units in the syndiotactic 1,2-configuration. The SPBD will generally have a melting point ranging from 150° C. to 220° C. In most cases, it is preferable for the SPBD to have a melting point of at least about 180° C. and it is more preferable for the SPBD to have a melting point of at least about 200° C.

It is very important for the SPBD to be highly dispersed throughout the rubbers with which it is being compounded. Typically, the SPBD is dispersed in a rubber elastomer to assist in the further mixing with rubber gel and elastomer containing olefinic unsaturation. Highly dispersed blends of SPBD throughout rubbery elastomers can be prepared by utilizing inverse phase polymerization. Such blends of SPBD with the rubbery elastomer can then be further compounded to obtain rubber blends which are useful in the practice of this invention. U.S. Pat. No. 5,283,294 reveals a process for preparing a highly dispersed blend of a syndiotactic 1,2-polybutadiene in a rubbery elastomer (synthetic polyisoprene) which comprises (A) polymerizing 1,3-butadiene monomer in an organic solvent under conditions and in the presence of a catalyst which results in the formation of a polymer cement of the syndiotactic 1,2-polybutadiene in the organic solvent, (B) polymerizing at least one diene monomer (such as butadiene or isoprene) in the polymer cement under conditions and in the presence of a catalyst which results in the formation of the rubbery elastomer to produce a rubber cement having syndiotactic 1,2-polybutadiene dispersed therein, and (C) recovering the highly dispersed blend of the syndiotactic 1,2-polybutadiene in the rubbery elastomer from the organic solvent in the rubber cement.

A highly dispersed blend of SPBD in polyisoprene can be prepared by polymerizing 1,3-butadiene monomer in a polyisoprene cement in the present of a catalyst composition which is comprised of:

(A) an organometallic compound, (B) a transition metal compound, and (C) carbon disulfide.

A detailed description of such catalyst systems is given in U.S. Pat. No. 3,778,424, which is herein incorporated by reference in its entirety.

The transition metal compounds that can be employed in the catalyst composition include: β-diketone complexes of cobalt; β-keto acid ester complexes of cobalt; cobalt solids of organic carboxylic acids; complexes of halogenated cobalt compounds in the formula $CoX_n$, wherein X represents a halogen atom and n represents 2 or 3, with an organic compound; and the like. The organometallic compounds that can be employed in the catalyst composition include: organoaluminum compounds of the formula: $AlR_3$; organolithium compounds of the formula: LiR; organomagnesium compounds of the formula $MgR_2$ and the like. The preferred organometallic compounds are the organoaluminum compounds of the formula $AlR_3$ and the organolithium compounds of the formula LiR.

The catalyst compositions used can be microencapsulated by employing a pre-reaction process. In this pre-reaction process, the organometallic component and the transition metal compound component of the catalyst composition are dissolved in an inert organic solvent with at least one polyene monomer. The ratio of the monomer to the transition metal compound in this catalyst component solution should be at least 1.0 and preferably about 25 by mole. This catalyst component solution is preferably prepared at a temperature of 10° C. to 50° C., and preferably contains 0.0005 to 1.0 percent by mole, more preferably 0.001 to 0.5 percent by mole of the transition metal compound and 0.001 to 10 percent by mole and more preferably, 0.03 to 5 percent by mole of the organometallic compound based on the amount by mole of monomer that will be polymerized in the main polymerization in the cis-1,4-polybutadiene cement.

The polymer produced is composed essentially of syndiotactic 1,2-polybutadiene and generally has a melting point of 70° C. to 210° C. The crystallinity and melting point of the polybutadiene produced by using this process can be controlled by adding hydrocarbon-soluble alcohols, ketones, nitrites, aldehydes or amides to the polymerization mixture.

A catalyst component solution can be prepared by dissolving at least one cobalt compound and at least one organoaluminum compound in an inert organic solvent containing at least one polyene monomer dissolved therein.

The cobalt compound is soluble in the inert organic solvent and is selected from the group consisting of (A) β-diketone complexes of cobalt, (B) β-keto acid ester complexes of cobalt, (C) cobalt salts or organic carboxylic acid having 1 to 25 carbon atoms, and (D) complexes of halogenated cobalt compounds of the formula: $CoX_n$;

wherein X represents a halogen atom and n represents 2 or 3, with an organic compound selected from the group consisting of tertiary amines, alcohols, tertiary phosphines, ketones and N,N-dialkylamides.

The β-diketone compound to form a complex with a cobalt atom is of the formula:

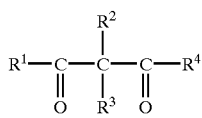

wherein $R^1$ and $R^4$, which are the same as or different from one another, are alkyl radical of 1 to 6 carbon atoms and $R^2$ and $R^3$, which are the same as or different from one another, are a hydrogen atom or an alkyl radical having 1 to 6 carbon atoms. This type of β-diketone complex of cobalt may be cobalt (II) acetylacetonate or cobalt (III) acetylacetonate.

The β-keto acid ester to form a complex without a cobalt atom may be of the formula:

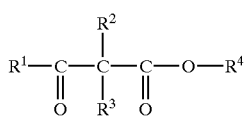

wherein $R^1$, $R^2$, $R^3$ and $R^4$ are the same as defined above. This type of cobalt complex may be a cobalt-acetoacetic acid ethyl ester complex. The cobalt salt of organic carboxylic acid may be either cobalt octoate or cobalt naphthenate.

In the ligand compounds capable of forming a complex with a halogenated cobalt compound, the tertiary anime may be pyridine, triethylamine, tributylamine or dimethylaniline, the alcohol may be methyl alcohol or ethyl alcohol, the tertiary phosphine may be trimethyl phosphine, tributyl phosphine or triphenyl phosphine, the ketone may be acetone or methyl ethyl ketone and the N,N-dialkylamide may be N,N-dimethylformamide, N,N-dimethylacetamide, N,N-diethylformamide or N,N-diethylacetamide. The complex of halogenated cobalt is preferably either a complex of cobalt chloride with pyridime or ethyl alcohol.

The organoaluminum compounds which can be used are the same types of those which are used in the three component nickel catalysts previously described herein for producing high cis-1,4-polybutadiene.

In the preparation of the catalysts component solution, it is desirable for the cobalt compound and the organoaluminum compound to be dissolved in the inert organic solvent containing at least one polyene. Some polyenes that can be used in the formation of the polyene products used to prepare microencapsulated catalysts are 1,3-butadiene, 1,3-pentadiene, isoprene, myrcene and 1,5-cyclooctadiene. Polyenes in which at least two of the double bonds are conjugated and which have minimal substitution on the double bonds are preferred, particularly 1,3-butadiene. Other olefins which can be used are those which are capable of serving as chelating agents for transition metals, such as 1,5-cyclooctadiene. Polyenes with neither conjugation nor good chelating potential are much less effective. The polyene is preferably used in a ratio by mole of at least 1.0, more preferably, least 5.0 to the amount by mole of the cobalt compound to used in the catalyst component solution. The preferred polyenes for use in this invention are 1,3-butadiene, 1,3-pentadiene, isoprene and myrcene. The most preferred polyene is 1,3-butadiene.

Generally, the larger the ratio of the amount of polyene to the cobalt compound in the catalyst component solution, the higher the activity of the catalyst. However, the activity of the catalyst reaches a maximum value, at a ratio by mole of polyene monomer to the cobalt compound used in the catalyst component solution of between 10 and 200. For example, if a molar ratio of polyene monomer to the cobalt compound of 10,000 is employed, the activity of the catalyst will be similar to that of the catalyst prepared from a catalyst component solution containing a ratio of polyene monomer to the cobalt compound of from 10 to 200. If the ratio is less than 1.0, the resultant catalyst composition has poor activity.

The catalyst component solution is preferably prepared at a temperature of 10° C. to 50° C. and preferably contains 0.0005 to 1.0 percent by mole, more preferably 0.001 to 0.5 percent by mole, of the cobalt compound. 0.001 to 10 percent by mole, more preferably 0.03 to 5 percent by mole of the organoaluminum compound based on the amount by mole of 1,3-butadiene to be polymerized. The ratio by mole of the organoaluminum compound to the cobalt compound is preferably in a range from 0.5 to 50, more preferably, from 0.2 to 10.

In the preparation of the catalyst component solution, it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution, the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose the entire amount of the organoaluminum compound.

It is preferable that the catalyst component solution be prepared using a dehydrated inert organic solvent. However, a trace of water in the inert organic solvent can be present up to a concentration of about 500 ppm (parts per million by weight). In fact, it is believed that the total elimination of water from such a catalyst component solution is undesirable. It is preferred for no more than 200 ppm of water to be present in the inert organic solvent used in the preparation of the catalyst component solution. If the content of water in the inert organic solvent is larger than 500 ppm, the catalyst component solution has to contain a relatively large amount of the cobalt compound and organoaluminum compound. This results in an economic disadvantage. If a sufficient amount of water is present in the inert organic solvent used in the preparation of the catalyst component solution, the catalyst can be completely destroyed.

It is desirable to allow the pre-reaction used in the preparation of the catalyst component solution to run for a period of at least 30 seconds, and more preferably for at least 1 minute before mixing the catalyst component solution with the 1,3-butadiene/water mixture to form the reaction mixture. Longer time periods can be used without the catalyst component solution losing its activity.

After the catalyst component solution is prepared, it can be added to the high cis-1,4-polybutadiene cement containing 1,3-butadiene monomer. Agitation should be provided in order to ensure that the catalyst component solution and monomer are distributed essentially homogeneously throughout the mixtures. The polymerization is initiated by mixing carbon disulfide throughout the rubber cement containing the above described catalyst component solution.

The amount of carbon disulfide that can be added will vary between 0.005 mole percent and 2 mole percent based on the amount of moles of 1,3-butadiene to be polymerized in the rubber cement. More preferably, the amount of carbon disulfide added will vary between 0.001 and 1 mole percent based on the amount of moles of 1,3-butadiene to be polymerized in the rubber cement.

The larger the proportion of the carbon disulfide in a range from about 0.005 to about 0.5 percent by mole based on the amount by mole of the 1,3-butadiene to be polymerized in the rubber cement, the larger the yield of the polymer product obtained from the polymerization mixture. However, too large an amount of carbon disulfide, for example, larger than 0.5 percent by mole, causes a decrease in the polymer yield.

The crystallinity and melting point of the SPBD produced can be controlled by adding alcohols, ketones, nitrites, aldehydes or amides to the polymerization mixture. A detailed description of the agents and techniques that are used to control crystallinity and melting points of SPBD is given in U.S. Pat. Nos. 3,901,868 and 4,153,767. These patents are incorporated herein by reference in their entirety.

The 1,3-butadiene monomer in the polymerization mixture is converted into SPBD while agitating the rubber cement. If the use of an antioxidant is desired, it may be added conveniently at the beginning of the polymerization. This polymerization of 1,3-butadiene monomer can be carried out at a temperature from about −20° C. to about 90° C. It is preferable for the polymerization temperature to be carried out at 0° C. to 40° C. The most preferred polymerization temperature is about 10° C.

This polymerization can be carried out either under a normal pressure or in a pressurized system. This polymerization of 1,3-butadiene monomer into SPBD can be carried out under a nitrogen atmosphere with good results. Such a polymerization can be run for a period of from about 1 to about 30 hours. It is generally preferred for the polymerization to be run for about 10 hours. However, the optimum polymerization time will vary greatly with the polymerization temperature, catalyst, the amount of catalyst used, etc. This polymerization of 1,3-butadiene monomer into SPBD can, of course, be done on a continuous basis.

The polyisoprene cement utilized in such inverse phase polymerizations can be synthesized employing standard techniques. For example, the polyisoprene cement can be made by polymerizing isoprene into polyisoprene in an organic solvent with a titanium tetrachloride/trialkylaluminum catalyst in the presence of polyhalogenated lower aliphatic or cycloaliphatic hydrocarbons. The organic solvent utilized will normally be a saturated aliphatic hydrocarbon or an aromatic hydrocarbon. Some representative examples of suitable aromatic solvents include benzene, toluene, xylenes, ethylbenzene, diethylbenzene, isobutylbenzene, and the like. Some representative examples of suitable aliphatic solvents include n-hexane, cyclohexane, methylcyclohexane, isohexanes, n-heptane, n-octane, isooctanes, n-decane, 2,2-dimethylbutane, petroleum ether, kerosene, petroleum spirits, petroleum naphtha and the like. However, it will normally be desirable to select a solvent which is inert with respect to the catalyst system which will be employed to initiate the polymerization reaction.

The polymerization medium utilized will normally contain from about 5 weight percent to about 35 weight percent monomers and polymers based upon the total weight of the polymerization medium. Accordingly, the rubber cement ultimately produced will contain from about 5 weight percent to about 35 weight percent polymers based upon the total weight of the rubber cement. The polymerization medium or polymer cement will preferably contain from about 10 percent to about 30 percent monomers and polymers. It will generally be more preferred for the polymerization medium of polymer cement to contain from about 15 weight percent to about 25 weight percent monomers and polymers. In commercial operations, the polymerization medium or rubber cement utilized will typically contain about 20 weight percent monomers and polymer.

After the SPBD has been synthesized in the polyisoprene rubber cement, the rubbery polyisoprene and the SPBD can be simultaneously coagulated from the organic solvent in the rubber cement. The blend recovered is a highly dispersed blend of the crystalline SPBD through the rubbery polyisoprene. Residual amount of solvent in the blend can, of course, be removed by evaporation or other suitable techniques.

Highly dispersed blends of SPBD in rubbery elastomers can also be prepared utilizing SPBD latex at the polymerization medium for producing emulsion rubbers. Such highly dispersed blends can also be prepared by mixing SPBD latex with the latex of a rubbery elastomer prior to coagulation. The coagulation of such blended latices results in the formation of a highly dispersed blend of SPBD throughout the rubbery elastomer. Such techniques are disclosed in U.S. Pat. No. 4,902,741, which is incorporated herein by reference in its entirety.

When a highly dispersed blends of SPBD with synthetic polyisoprene, cis 1,4-polybutadiene or mixtures thereof is used for mixing with the rubber gel, the blend of SPBD will typically contain from about 5 weight percent to about 40 weight percent SPBD, based upon the total weight of the rubber/SPBD blend. Such blends will preferably contain from about 12 to about 25 weight percent SPBD and will more preferably contain from about 16 weight percent to about 20 weight percent SPBD.

When the SPBD is added to the rubber gel as a highly dispersed blend of SPBD with another rubber, such other rubber should be calculated as component C, namely as part of the rubber containing olefinic unsaturation.

In addition to the rubber gel and syndiotactic 1,2-polybutadiene, the rubber component contains a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. The rubber containing olefinic unsaturation may be the same or different than used in the highly dispersed blend of SPBD. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinyl-ethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect, the rubber to be combined with the rubber gel and syndiotactic 1,2-polybutadiene may be a blend of at least two diene based rubbers. For example, a blend of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene butadiene rubbers, cis 1,4-polybutadiene rubbers and emulsion polymerization prepared butadiene/acrylonitrile copolymers.

In one aspect of this invention, an emulsion polymerization derived styrene butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When used in the tire tread, the relatively high styrene content of about 30 to about 45 for the E-SBR can be considered beneficial for a purpose of enhancing traction, or skid resistance. The presence of the E-SBR itself is considered beneficial for a purpose of enhancing proccessability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition to the rubber gel, blend containing syndiotactic 1,2-polybutadiene and second rubber in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N115, N121, N134, N220, N231, N234, N242, N293, N299, S315, N326, N330, M332, N339, N343, N347, N358, N375, N539, N550, N582, N630, N642, N650, N660, N683, N754, N762, N774, N787, N907, N908, N990 and N991. These carbon blacks have iodine absorptions ranging from 9 to 170 g/kg and DBP No. ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

$$Z-Alk-S_n-Alk-Z$$

in which Z is selected from the group consisting of

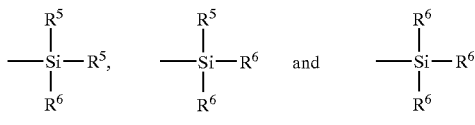 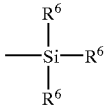

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,1 8'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3 '-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silyipropyl) sulfides. The most preferred compounds are 3,3'-bis (triethoxysilylpropyl) disulfide and 3,3'-bis (triethoxysilylpropyl) tetrasulfide. Therefore as to the above formula, preferably Z is where $R^6$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of the above formula in a rubber composition will vary depending on the level of other additives that are used. Generally speaking, the amount of the compound of the above formula will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition containing the rubber gel, blend containing SPBD and rubber containing olefinic unsaturation may be incorporated in a variety of rubber components of the tire. For example, the rubber component may be a tread (including tread cap and tread base), sidewall, apex, chafer, sidewall insert, wirecoat, innerliner, and ply coat. Preferably, the compound is a sidewall insert or a tread.

The pneumatic tire of the present invention may be a passenger tire, motorcycle tire, aircraft tire, agricultural, earthmover, off-the-road, truck tire and the like. The term "truck tire" includes light truck, medium truck and heavy truck. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be a radial or bias, with a radial tire being preferred.

EXAMPLE 1

In this Example, a polybutadiene rubber gel and syndiotactic polybutadiene were evaluated in a natural rubber composition.

Rubber composition containing the materials set out in Table 1 were prepared using two separate stages of addition (mixing); namely one non-productive mix stage and one productive mix stage. The non-productive stage was mixed for two minutes at a rubber temperature of 160° C. The drop temperature for the productive mix stage was 115° C.

The rubber compositions are identified as Sample A through Sample E. Samples A through C are considered as controls due to the absence of rubber gel and syndiotactic polybutadiene.

The Samples were cured at about 160° C. for about 14 minutes.

Table 2 illustrates the physical properties of the cured Samples A through E.

TABLE 1

| Examples | A | B | C | D | E |
|---|---|---|---|---|---|
| First Non-productive Mix Stage | | | | | |
| Natural rubber[1] | 80 | 80 | 80 | 80 | 80 |
| Cis 1,4-polybutadiene rubber[2] | 20 | 0 | 20 | 0 | 0 |
| Syndio-PBD (17% active) in Cis-BR[3] | 0 | 20 | 0 | 20 | 20 |
| Precipitated silica[4] | 35 | 35 | 35 | 0 | 35 |
| Coupling agent[6] | 6 | 3 | 6 | 6 | 6 |
| PBD rubber gel[6] | 0 | 0 | 35 | 35 | 35 |
| Zinc oxide | 5 | 5 | 5 | 5 | 5 |
| Stearic acid | 1 | 1 | 1 | 1 | 1 |
| Antidegradant[7] | 1 | 1 | 1 | 1 | 1 |
| Antidegradant[8] | 2 | 2 | 2 | 2 | 2 |
| Productive Mix Stage | | | | | |
| Insoluble sulfur[9] | 1 | 1 | 1 | 1 | 1 |
| Vulcuren KA9188[10] | 1 | 1 | 1 | 1 | 1 |
| Antidegradant[11] | 1 | 1 | 1 | 1 | 1 |
| Accelerator, guanidine type | 0.6 | 0.6 | 0.6 | 0 | 0.6 |
| Accelerator, sulfenamide | 1.5 | 1.5 | 1.5 | 1.5 | 1.5 |

[1]Standard technical rubber TSR 10
[2]Cis-1,4-polybutadiene rubber obtained as Budene ® 1207 from The Goodyear Tire & Rubber Company
[3]Ubepol ™ VCR617 from UBE Industries, 17 percent syndio-PBD with melting point dispersed in Cobalt high cis- polybutadiene rubber
[4]Zeosil ™ 115MP from the Rhodia S.A. Company
[5]Bis-(3-triethoxysilylpropyl) tetrasulfide obtained as Si69 from Degussa S.A.
[6]Experimental unmodified emulsion-butadiene rubber gel with 200 nm diameter and cross-linked with 3 phr dicumlperoxide
[8]Phenylenediamine types
[9]Insoluble sulfur (80 percent active) obtained as Crystex OT20HS from Akzo
[10]Vulcuren KA9188 corresponds to 1,6-bis(N,N'- dibenzylthiocarbamoyldithio)-hexane obtained from Bayer
[11]Phenylenediamine types

TABLE 2

| Examples | A | B | C | D | E |
|---|---|---|---|---|---|
| Green specific gravity (g/ccm) | 1.092 | 1.095 | 1.067 | 0.967 | 1.069 |
| Rebound (Zwick) | | | | | |
| 23° C. | 77.3 | 75.3 | 65 | 72.1 | 64 |
| 100° C. | 84.3 | 85.6 | 81.8 | 86.6 | 82.3 |
| Shore A hardness original | 58.5 | 61.3 | 67.6 | 55.8 | 70.1 |
| Stress-strain (ASTM D412) at 100° C. | | | | | |
| 100% modulus (MPa) | 2.6 | 2.4 | 4.2 | 2.2 | 4.6 |
| 200% modulus (MPa) | 6.9 | 5.9 | 0 | 0 | 0 |
| Elongation at break (%) | 207.2 | 286.9 | 137.8 | 177.9 | 102 |
| Tensile strength (MPa) | 7.2 | 10 | 6.4 | 4.1 | 5.6 |
| Stress-strain (ASTM D412) at 23° C. | | | | | |
| 100% modulus (MPa) | 2.4 | 2.7 | 4.1 | 2.1 | 5.3 |
| 200% modulus (MPa) | 7.1 | 7.4 | 12.6 | 4.9 | 15.2 |
| Elongation at break (%) | 357.3 | 407.8 | 240.8 | 408.5 | 207.1 |
| Tensile strength (MPa) | 18.9 | 22.1 | 16.7 | 15.7 | 15.7 |
| RPA at 100° C. | | | | | |
| Dynamic storage modulus (1% strain) (MPa) | 1.03 | 1.195 | 1.615 | 0.892 | 1.795 |
| Dynamic loss modulus (10% strain) (MPa) | 0.022 | 0.033 | 0.047 | 0.018 | 0.048 |
| Tan delta (10% strain) | 0.022 | 0.03 | 0.032 | 0.021 | 0.028 |

It can be seen from Table 2 that the use of gels in combination with SPBD (Examples D and E) is beneficial in regard to the overall stiffness/hysteresis balance, combining a low level in hysteresis (=dynamic loss modulus) with high dynamic stiffness (=dynamic storage modulus).

The gel/SPBD sample in Example D shows clear improvements in regard to dynamic loss modulus, elongation at break (23° C.) and weight compared to the three control compounds (Examples A through C). A weight reduction is considered beneficial for lower rolling resistance and fuel consumption. Higher elongations at break indicate improved durability performance of the tire.

Combining gel/SPBD with silica (Example E) gives an additional significant improvement in modulus 100 (23° C. and 100° C.), dynamic storage and loss modulus and tan delta. Low amplitudes in loss modulus and tan delta are favorable because of reduced heat generation. The improvement in modulus 100 percent at 100° C. is important for the tire application and is a consequence of the unique combination of the entropy elastic behavior of the gel with the hard and energy elastic properties of the SPBD. Rebound properties at 23° C. are also improved, indicating improved wet skid resistance for a tire with a tread of such formulation.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component where the rubber in said component is comprised of
   (A) from 10 to 75 phr of a crosslinked rubber gel filler having a swelling index (Qi) in toluene of from 1 to 15, a particle diameter of from 20 to 1,000 nm, and selected from the group consisting of polybutadiene gel, styrene butadiene gel and natural rubber gel, acrylonitrile-butadiene gel, polychloroprene gel and mixtures thereof;
   (B) from 1 to 25 phr of syndiotactic 1,2-polybutadiene; and
   (C) a second rubber, wherein said second rubber is an elastomer containing olefinic unsaturation.

2. The pneumatic tire of claim 1 wherein said syndiotactic 1,2-polybutadiene is a highly dispersed blend with a rubber and contains from 5 weight percent to about 40 weight percent syndiotactic 1,2-polybutadiene.

3. The pneumatic tire of claim 1 wherein said crosslinked rubber gel filler is polybutadiene gel.

4. The pneumatic tire of claim 1 wherein said crosslinked rubber gel filler is a styrene butadiene gel.

5. The pneumatic tire of claim 4 wherein said crosslinked rubber gel filler is grafted with a polar unsaturated monomer.

6. The pneumatic tire of claim 5 wherein said polar unsaturated monomer is selected from the group consisting of acrylic acid, methacrylic acid, acrylamide, methacrylamide, N-methoxymethyl methacrylic acid amide, N-acetoxxymethyl methacrylic acid amide, acrylonitrile, dimethyl acrylamide, hydroxyethyl acrylate, hydroxyethyl methacrylate, hydroxypropyl acrylate, hydroxypropyl methacrylate, hydroxybutyl acrylate, hydroxybutyl methacrylate.

7. The pneumatic tire of claim 5 wherein from 1 to 20 weight percent of said crosslinked rubber gel filler is derived from said polar unsaturated monomer.

8. The pneumatic tire of claim 1 wherein said second rubber is selected from the group consisting of natural rubber, neoprene, polyisoprene, butyl rubber, halobutyl rubber, polybutadiene, styrene butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, carboxylated rubber, EPDM, silicon-coupled star-branched polymers, tin-coupled star-branched polymers and mixtures thereof.

9. The pneumatic tire of claim 1 wherein from 0.5 to 20 phr of a sulfur containing organosilicon compound is present and is of the formula:

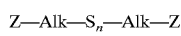

in which Z is selected from the group consisting of

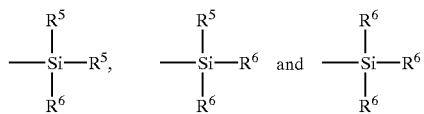

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

10. The pneumatic tire of claim 1 wherein said composition is thermomechanically mixed at a rubber temperature in a range of from 140° C. to 190° C. for a total mixing time of from 1 to 20 minutes.

11. The pneumatic tire of claim 1 wherein said tire is selected from the group consisting of passenger tires, motorcycle tires, aircraft tires, agricultural, earthmover, off-the-road and truck tires.

12. A pneumatic tire of claim 1 wherein said rubber component is selected from the group consisting of a tread cap, tread base, sidewall, apex, chafer, sidewall insert, innerliner, wirecoat and ply coat.

13. The pneumatic tire of claim 1 wherein the syndiotactic polybutadiene has a melting point of from 150° C. to 220° C.

14. The pneumatic tire of claim 1 wherein the rubber in said component contains from 10 to 250 phr of a filler selected from the group consisting of silica and carbon black.

15. The pneumatic tire of claim 14 wherein said filler is silica.

16. The pneumatic tire of claim 14 wherein said filler is carbon black.

* * * * *